(12) United States Patent
Washizu

(10) Patent No.: US 9,648,222 B2
(45) Date of Patent: May 9, 2017

(54) IMAGE CAPTURING APPARATUS THAT CONTROLS SUPPLY OF AMPERAGE WHEN READING OUT PIXEL SIGNALS AND METHOD FOR CONTROLLING THE SAME

(71) Applicant: CANON KABUSHIKI KAISHA, Tokyo (JP)

(72) Inventor: Sho Washizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 14/723,859

(22) Filed: May 28, 2015

(65) Prior Publication Data

US 2015/0358566 A1  Dec. 10, 2015

(30) Foreign Application Priority Data

Jun. 5, 2014 (JP) .................................. 2014-117090
Dec. 8, 2014 (JP) .................................. 2014-248416

(51) Int. Cl.
*H04N 5/232* (2006.01)
*G02B 13/00* (2006.01)
*H04N 5/369* (2011.01)
*H04N 5/3745* (2011.01)

(52) U.S. Cl.
CPC ..... *H04N 5/23212* (2013.01); *G02B 13/0015* (2013.01); *H04N 5/23241* (2013.01); *H04N 5/3696* (2013.01); *H04N 5/37452* (2013.01); *H04N 5/37457* (2013.01)

(58) Field of Classification Search
None
See application file for complete search history.

(56) References Cited

U.S. PATENT DOCUMENTS

| 8,189,086 | B2* | 5/2012 | Hashimoto | H04N 5/3456 348/222.1 |
| 8,284,257 | B2* | 10/2012 | Fukui | G06K 9/00234 348/169 |
| 9,319,614 | B2* | 4/2016 | Shimada | H04N 5/378 |
| 2006/0214287 | A1* | 9/2006 | Ogihara | B41J 2/45 257/723 |

(Continued)

FOREIGN PATENT DOCUMENTS

JP  2001-124984 A  5/2001
JP  2010272903 A  * 12/2010  .............. H04N 5/232

OTHER PUBLICATIONS

JP 2010272903 A; Dec. 2010; English Translation.*

*Primary Examiner* — Roberto Velez
*Assistant Examiner* — Cynthia Segura
(74) *Attorney, Agent, or Firm* — Cowan, Liebowitz & Latman, P.C.

(57) ABSTRACT

An image capturing apparatus including a plurality of photoelectric conversion portions for each of a plurality of microlenses, the image capturing apparatus comprising: a readout unit configured to be driven using a first driving method in which a signal is read out from part of the plurality of photoelectric conversion portions, and a second driving method in which a signal is read out from a greater number of the photoelectric conversion portions than in the first driving method; and a supply unit configured to, in a case where a signal is read out using the first driving method, supply an amperage that is smaller than that in a case where a signal is read out using the second driving method, to the readout unit.

10 Claims, 12 Drawing Sheets

(56) References Cited

U.S. PATENT DOCUMENTS

| | | | | |
|---|---|---|---|---|
| 2008/0252742 | A1* | 10/2008 | Oike | H04N 5/3741 348/222.1 |
| 2009/0021621 | A1* | 1/2009 | Hashimoto | H04N 5/3456 348/300 |
| 2009/0128671 | A1* | 5/2009 | Kusaka | H04N 5/23212 348/246 |
| 2010/0053419 | A1* | 3/2010 | Fukui | G06K 9/00234 348/352 |
| 2013/0250147 | A1* | 9/2013 | Fransson | H04N 5/23241 348/241 |
| 2014/0313329 | A1* | 10/2014 | Julien | H04N 7/183 348/143 |
| 2015/0237282 | A1* | 8/2015 | Shimada | H04N 5/23258 348/297 |
| 2015/0350583 | A1* | 12/2015 | Mauritzson | H04N 5/378 250/208.1 |
| 2016/0112626 | A1* | 4/2016 | Shimada | H04N 5/347 348/349 |

* cited by examiner

… (1)

IMAGE CAPTURING APPARATUS THAT CONTROLS SUPPLY OF AMPERAGE WHEN READING OUT PIXEL SIGNALS AND METHOD FOR CONTROLLING THE SAME

BACKGROUND OF THE INVENTION

Field of the Invention

The present invention relates to an image capturing apparatus and a method for controlling the same.

Description of the Related Art

Image sensors used in image capturing apparatuses such as digital still cameras and digital video cameras are being provided with more functions, and for example there are known to be image sensors that realizes a phase difference focus detection. Specifically, two photodiodes and one microlens are provided in each pixel of the image sensor. With a configuration in which each photodiode receives light that has passed through different pupil regions in an imaging lens unit, it is possible to perform phase difference focus detection using signals output from the photodiodes. Also, by adding signals output from two photodiodes provided in the same pixel together, image output can be obtained (Japanese Patent Laid-Open No. 2001-124984).

However, with the configuration described in Japanese Patent Laid-Open No. 2001-124984, it is necessary to acquire signals from two photodiodes per pixel. Therefore, in contrast to the conventional configuration in which one pixel has one photodiode, the readout time increases two-fold. There is a problem in that at the time of live view shooting or moving image shooting in which readout is performed at a predetermined frame rate, a standby time period per frame is shortened due to the increase in readout time compared to the conventional configuration, resulting in an increase in energy consumption of the image sensor. Also, the amount of heat generated in the image sensor increases due to the increase in energy consumption, as a result of which the temperature of the exterior package of the camera increases. As a result, a period of time in which the temperature of the exterior package reaches an exterior package temperature that is permissible for camera quality decreases, which reduces the amount of time for which imaging can continue.

SUMMARY OF THE INVENTION

The present invention has been made in consideration of the above situation, and in an image capturing apparatus in which an image sensor that can realize phase difference focus detection is used, the energy consumption of the image sensor when a signal is read out is reduced.

According to the present invention, provided is an image capturing apparatus including a plurality of photoelectric conversion portions for each of a plurality of microlenses, the image capturing apparatus comprising: a readout unit configured to be driven using a first driving method in which a signal is read out from part of the plurality of photoelectric conversion portions, and a second driving method in which a signal is read out from a greater number of the photoelectric conversion portions than in the first driving method; and a supply unit configured to, in a case where a signal is read out using the first driving method, supply an amperage that is smaller than that in a case where a signal is read out using the second driving method, to the readout unit.

Further, according to the present invention, provided is a method for controlling an image capturing apparatus including a plurality of photoelectric conversion portions for each of a plurality of microlenses, and a readout unit configured to be driven using a first driving method in which a signal is read out from part of the plurality of photoelectric conversion portions and a second driving method in which a signal is read out from a greater number of the photoelectric conversion portions than in the first driving method, the control method comprising: supplying a current of a first amperage when a signal output from the photoelectric conversion portions is read out using the second driving method; and supplying a current of a second amperage that is smaller than the first amperage while a signal output from the part of the plurality of photoelectric conversion portions is being read out using the first driving method.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimension, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
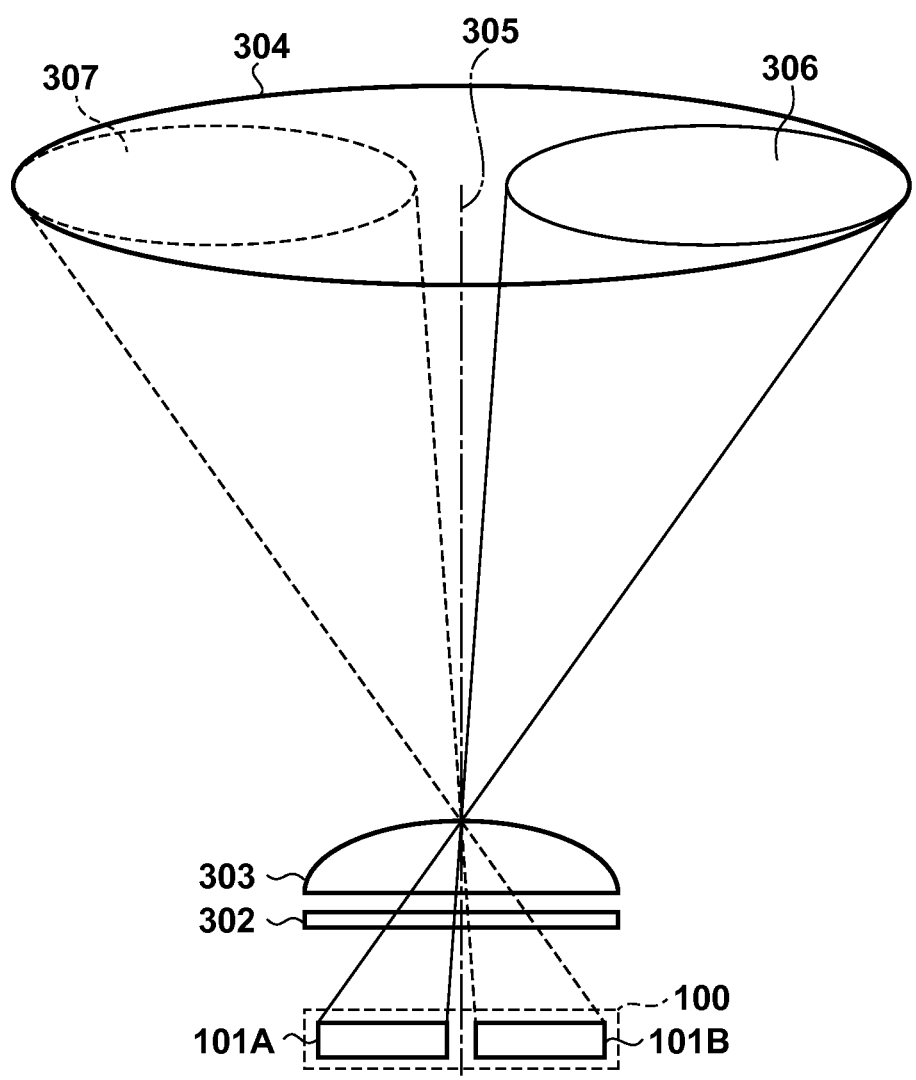
FIG. 1 is a diagram showing a concept in which luminous flux emitted from an exit pupil of an imaging lens unit of an image capturing apparatus enters a unit pixel according to an embodiment of the present invention enters a unit pixel.

First, the principle for realizing phase difference focus detection using an image sensor for image capture of a subject will be described. FIG. 1 is a diagram schematically showing a state in which luminous flux emitted from an exit pupil of an imaging lens unit enters one of the unit pixels included in the image sensor. A unit pixel 100 has a first photodiode (PD) 101A and a second photodiode (PD) 101B, and is covered by a color filter 302 and a microlens 303.

The center of an exit pupil 304 of the imaging lens unit with respect to the pixels having the microlens 303 is referred to as an optical axis 305. Light that has passed through the exit pupil 304 enters the unit pixel 100 centered about the optical axis 305. Also, as shown in FIG. 1, the luminous flux passing through a pupil region 306, which is a partial region of the exit pupil 304 of the imaging lens unit, passes through the microlens 303 and is received by the first PD 101A. Similarly, the luminous flux passing through a pupil region 307, which is a partial region of the exit pupil 304, passes through the microlens 303 and is received by the second PD 101B. Therefore, the first PD 101A and the second PD 101B respectively receive light that has passed through separate regions of the exit pupil 304. Thus, by comparing the signal of the first PD 101A to the signal of the second PD 101B, a phase difference can be detected.

Hereinafter, a signal obtained from the first PD 101A is referred to as an "A image signal", and a signal obtained from the second PD 101B is referred to as a "B image signal". Also, a signal read out by adding the signal of the first PD 101A and the signal of the second PD 101B can be used for a captured image, and is referred to as an (A+B) image signal.

Figure 2:
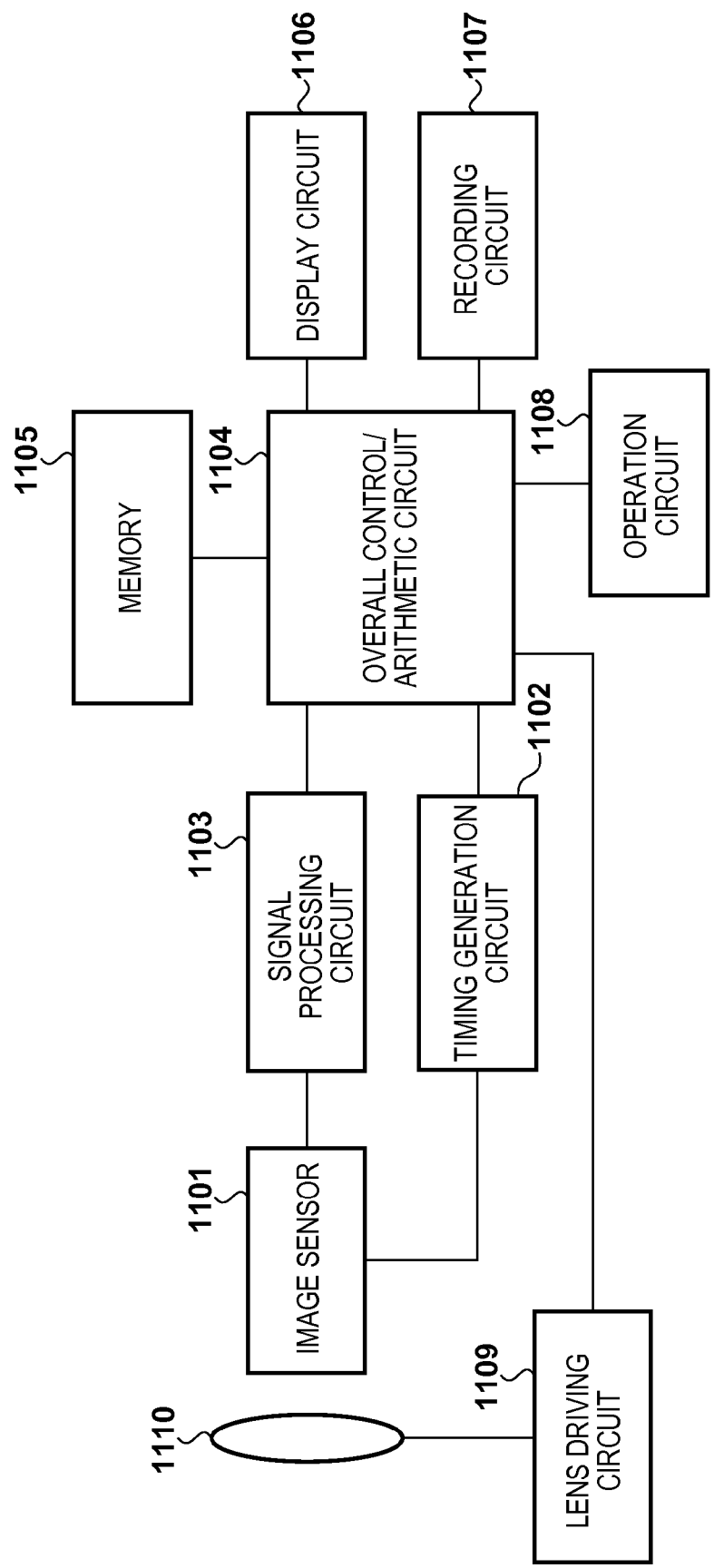
FIG. 2 is a block diagram showing a functional configuration of the image capturing apparatus according to an embodiment.

Next, the configuration of an image capturing apparatus according to the first embodiment shown in the block diagram of FIG. 2 will be described. A lens driving circuit 1109 performs zoom control, focus control, and diaphragm control for an imaging lens unit 1110, and the imaging lens unit 1110 forms an optical image of a subject on an image sensor 1101. A plurality of unit pixels 100 shown in FIG. 1 are arranged in matrix form in the image sensor 1101, the image of the subject formed on the image sensor 1101 is converted into an electrical image signal, and then the image signal is output from the image sensor 1101. A signal processing circuit 1103 performs various types of corrections on the image signal output from the image sensor 1101, and compresses data. Also, the signal processing circuit 1103 also generates the B image signal using the A image signal and (A+B) image signal acquired from the image sensor 1101.

A timing generation circuit 1102 outputs a timing signal that drives the image sensor 1101. An overall control/arithmetic circuit 1104 performs various types of arithmetic operations and controls overall operations of the image capturing apparatus including the operations of the image sensor 1101. The overall control/arithmetic circuit 1104 further performs a phase difference focus detection operation using the A image signal and B image signal. Image data output from the signal processing circuit 1103 is temporarily stored in a memory circuit 1105. A display circuit 1106 displays various types of information and a captured image. A recording circuit 1107 is a circuit for performing reading and writing on a detachable storage medium such as a semiconductor memory for recording or reading out image data. An operation circuit 1108 includes a group of input devices such as switches, buttons, and a touch panel, and receives a user instruction for the image capturing apparatus.

Figure 3:
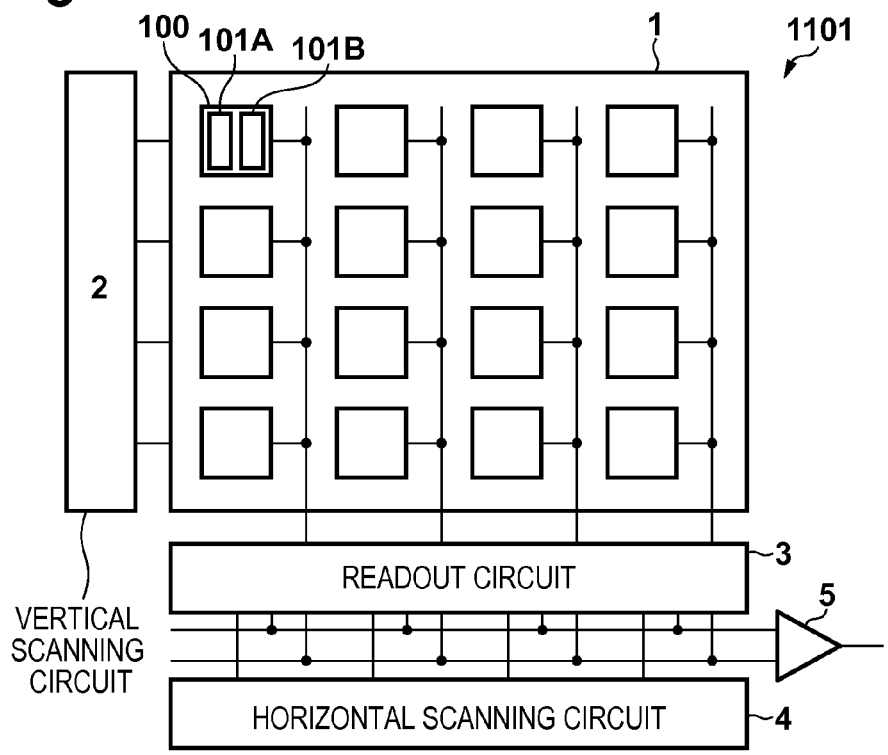
FIG. 3 is a diagram showing a configuration of an image sensor according to an embodiment.

Next, a configuration example of the image sensor 1101 will be described with reference to FIGS. 3 to 5. FIG. 3 is a diagram showing an overall configuration example of the image sensor 1101. The image sensor 1101 includes an image region 1, a vertical scanning circuit 2, a readout circuit 3, a horizontal scanning circuit 4, and an output amplifier 5. A plurality of unit pixels 100 are arranged in matrix form in the image region 1. Although 16 (=4×4) pixels are arranged here in order to simplify description, in actuality, multiple unit pixels are further arranged in matrix form. As described in FIG. 1, each unit pixel 100 includes the first PD 101A and the second PD 101B. In the present embodiment, the vertical scanning circuit 2 selects pixels in the image region 1 in units of one row and transmits a driving signal to the pixels in the selected row. The readout circuit 3 includes a column readout circuit in each column, amplifies a signal output from the unit pixel 100, and samples/holds the output signal. The horizontal scanning circuit 4 sequentially transmits signals for outputting the signals that are sampled and held by the readout circuit 3 to the output amplifier 5 for each column. The output amplifier 5 outputs the signal output from the readout circuit 3 under the operation of the horizontal scanning circuit 4 to the signal processing circuit 1103. The vertical scanning circuit 2, the readout circuit 3, and the horizontal scanning circuit 4 are driven according to timing signals output from the timing generation circuit 1102.

Figure 4:
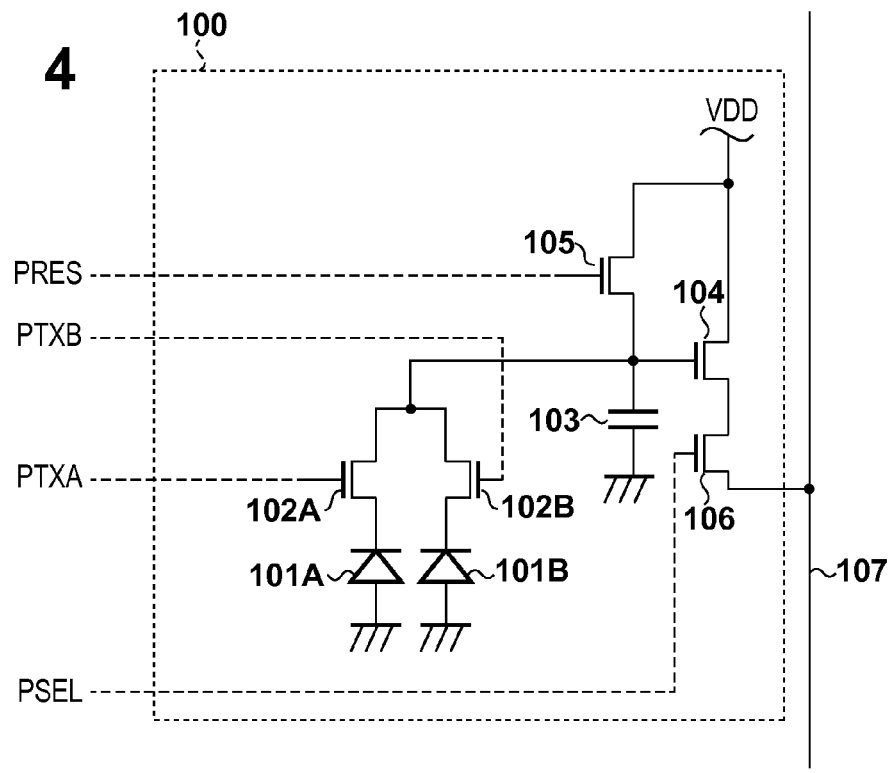
FIG. 4 is a circuit diagram of a unit pixel of the image capturing apparatus according to an embodiment.

FIG. 4 is a circuit diagram showing a configuration example of the unit pixel 100. A first transfer switch 102A and a second transfer switch 102B are respectively connected to the first PD 101A and the second PD 101B. Also, the outputs of the first transfer switch 102A and the second transfer switch 102B are connected to an amplifying unit 104 through a floating diffusion region (FD) 103. A reset switch 105 is connected to the FD 103, and a selection switch 106 is connected to the amplifying unit 104.

The first PD 101A and the second PD 101B receive light that has passed through the same microlens 303, and function as photoelectric conversion portions that generate signal charges corresponding to the received light. The first transfer switch 102A and the second transfer switch 102B are respectively controlled by transfer pulse signals PTXA and PTXB from the vertical scanning circuit 2 and both transfer the charges generated in the first PD 101A and the second PD 101B to the FD 103.

The FD 103 temporarily holds the charges transferred from the first PD 101A and the second PD 101B, and functions as a charge-voltage converter that converts the held charge into a voltage signal. The amplifying unit 104 is a source follower MOS transistor, amplifies the voltage signal based on the charge held in the FD 103 and outputs the resulting signal as an image signal. The reset switch 105 is controlled by a reset pulse signal PRES from the vertical scanning circuit 2 and resets the potential of the FD 103 to a reference potential VDD. The selection switch 106 is controlled by a control signal PSEL from the vertical scanning circuit 2 and outputs the image signal amplified by the amplifying unit 104 to a vertical output line 107.

Figure 5:
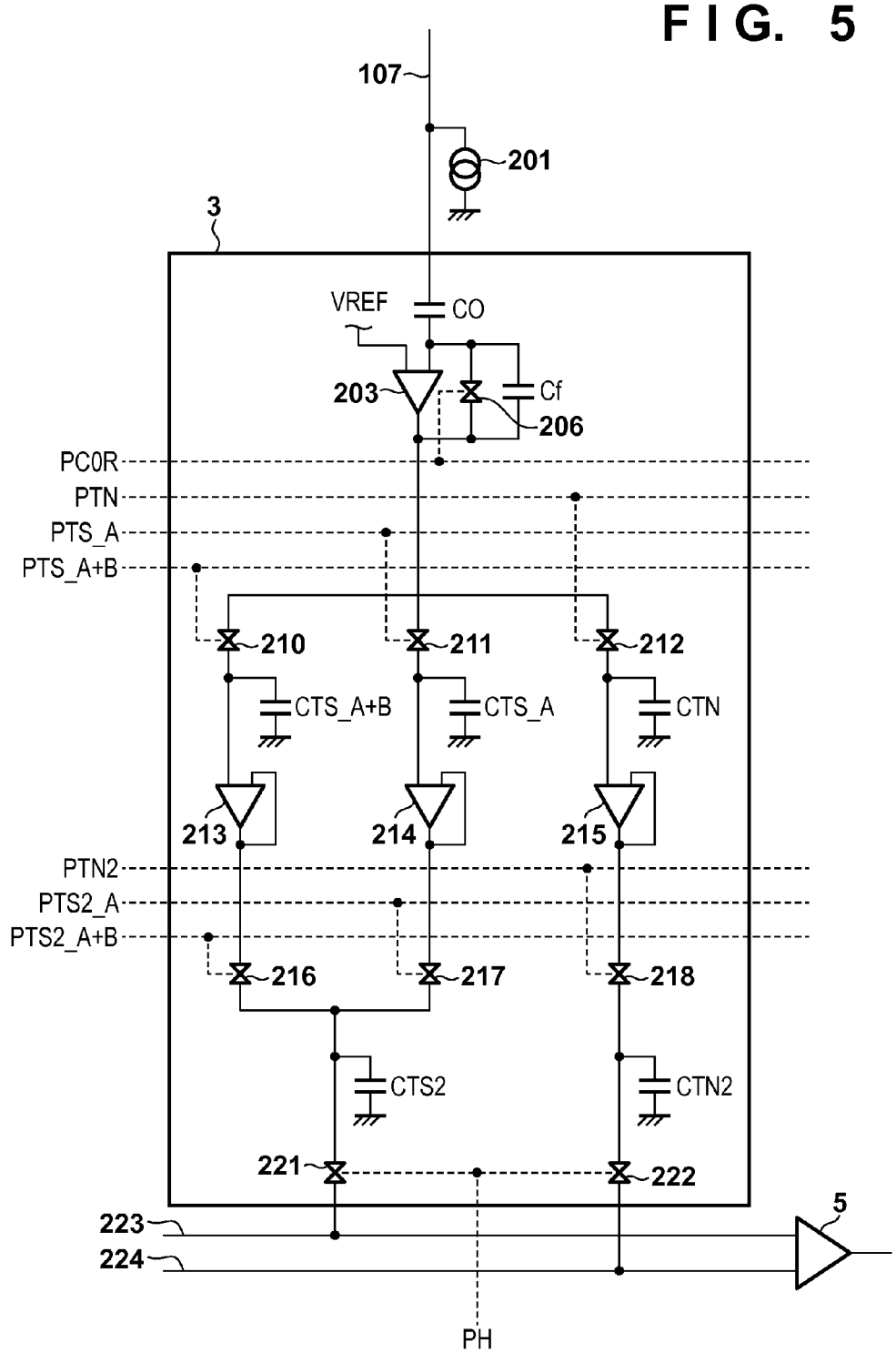
FIG. 5 is a circuit diagram showing a configuration example of one column of a readout circuit of the image sensor according to an embodiment.

FIG. 5 is a circuit diagram showing a configuration example of one column of the readout circuit 3 shown in FIG. 3. The readout circuit 3 includes a circuit having a configuration shown in FIG. 5 in each column, and the configuration of each column is the same, and thus only one column is shown in FIG. 5. A signal voltage on the vertical output line 107 is amplified by an operational amplifier 203. A reference voltage VREF is supplied to the operational amplifier 203. A clamp capacitor C0 is connected to the input of the operational amplifier 203, and a feedback capacitor Cf is connected between the input and the output of the operational amplifier 203. Also, a switch 206 for shunting two ends is provided at the two ends of the feedback capacitor Cf. The switch 206 is controlled by a PC0R signal of the readout circuit 3. A constant current source 201 is connected to the vertical output line 107.

Capacitors CTS_A+B, CTS_A, and CTN are capacitors for holding a signal voltage from the operational amplifier 203. Switches 210, 211, and 212 are switches that respectively control writing to the capacitors CTS_A+B, CTS_A, and CTN. The switch 210 is controlled by a signal PTS_A+B, the switch 211 is controlled by a signal PTS_A, and the switch 212 is controlled by a signal PTN. Capacitors CTS2 and CTN2 are capacitors for holding a signal voltage from the capacitors CTS_A+B, CTS_A, and CTN. Switches 216, 217, and 218 are switches for controlling writing to the capacitors CTS2 and CTN2. The switch 216 is for writing a signal of the capacitor CTS_A+B to the capacitor CTS2 and is controlled by a signal PTS2_A+B. The switch 217 is for writing a signal of the capacitor CTS_A to the capacitor CTS2 and is controlled by a signal PTS2_A. The switch 218 is for writing the signal of the capacitor CTN to the capacitor CTN2, and is controlled by a signal PTN2.

Also, voltage followers 213, 214, and 215 are provided immediately before the capacitors CTS2 and CTN2. The voltage followers 213, 214, and 215 transmit a potential that is equal to the potential accumulated in each of the capacitors CTS_A+B, CTS_A, and CTN to the capacitors CTS2 and CTN2, regardless of how the capacitors are divided.

The switches 221 and 222 are controlled by a PH signal from the horizontal scanning circuit 4, and a signal written to the capacitor CTS2 is output to the output amplifier 5 via a common output line 223 and a signal written to the capacitor CTN2 is output thereto via a common output line 224. It should be noted that the writing of signals to the capacitors CTS_A+B, CTS_A, and CTN, and signal readout from the capacitors CTS2 and CTN2 by horizontal scan are performed in parallel.

Figure 6:
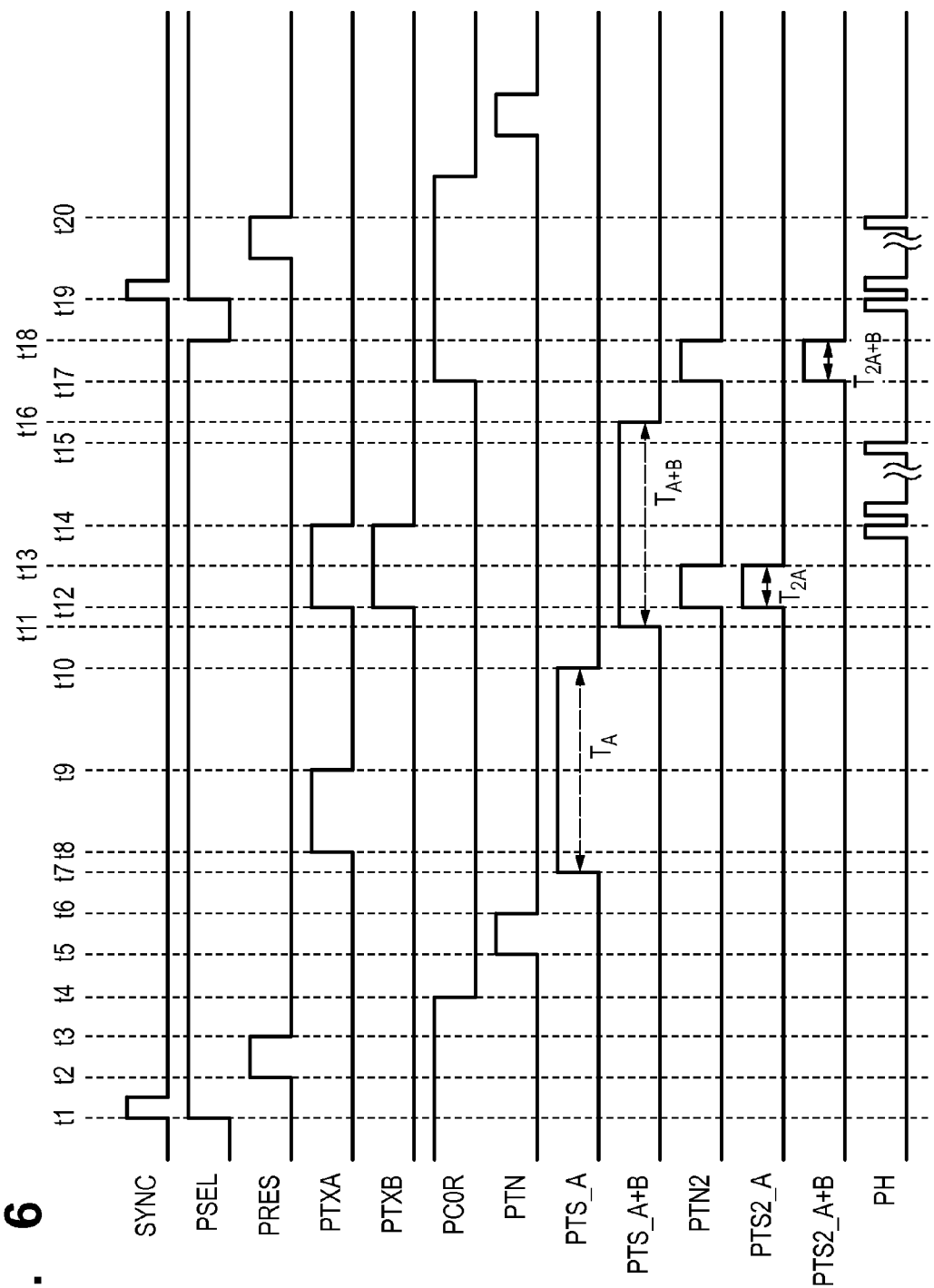
FIG. 6 is a timing chart showing driving of an image sensor according to a first embodiment.

FIG. 6 shows a timing chart for realizing a method for driving the image sensor 1101 according to the first embodiment. FIG. 6 indicates driving timing for when the vertical scanning circuit 2 has selected an arbitrary row. At time t1, a horizontal synchronizing signal SYNC rises and a control signal PSEL of the selected row is switched from L to H. Accordingly, the selection switch 106 in the selected row is turned on and a pixel signal in the selected row can be output to the vertical output line 107.

At time t2, a reset pulse signal PRES is switched from L to H, the reset switch 105 is turned on, and the potential of the FD 103 is reset to a power source potential VDD. At time t3, the reset pulse signal PRES is switched from H to L, the reset switch 105 is turned off, and the resetting of the FD 103 is stopped. At this time, the potential of the FD 103 is read out to the vertical output line 107 as a reset signal level via the amplifying unit 104, and the reset signal level is input to the readout circuit 3. In the readout circuit 3, the PCOR signal is H and the switch 206 is on, and the reset signal level is input to the clamp capacitor C0 in a state in which the operational amplifier 203 buffers the output of the reference voltage VREF.

Thereafter, the PCOR signal is switched from H to L at time t4, the signal PTN is switched to H at time t5 to turn on the switch 212, and then the output of the operational amplifier 203 at that time is written to the capacitor CTN as a reset voltage. Thereafter, at time t6, the signal PTN is switched to L to turn off the switch 212, as a result of which the writing of the reset voltage to the capacitor CTN ends.

At time t7, the signal PTS_A is switched to H and the switch 211 is turned on, leading to a state in which the signal can be written to the capacitor CTS_A. Subsequently, a transfer pulse signal PTXA is switched to H at time 8 to transfer the charge of the first PD 101A to the FD 103, and the transfer pulse signal PTXA is switched to L at time t9. Because of this operation, the charge accumulated in the first PD 101A is read out to the FD 103. Then, output corresponding to a change in the potential of the FD 103 is supplied to the readout circuit 3 via the amplifying unit 104 and the vertical output line 107.

In the readout circuit 3, the operational amplifier 203 amplifies and outputs the voltage supplied from the vertical output line 107 using a gain corresponding to the ratio between the clamp capacitor C0 and the feedback capacitor Cf. The signal voltage provided from the first PD 101A is written to the capacitor CTS_A. At time t10, the signal PTS_A is switched from H to L and the switch 211 is turned off to end the writing of the voltage to the capacitor CTS_A.

At time t11, the signal PTS_A+B is switched to H and the switch 210 is tuned on, leading to a state in which a signal can be written to the capacitor CTS_A+B. Subsequently, at time t12, the transfer pulse signal PTXB is switched to H at the same time as the transfer pulse signal PTXA is once again switched to H. Because of this operation, the charges of both the first PD 101A and the second PD 101B can be read out to the FD 103 at the same time. Then, the transfer pulse signals PTXA and PTXB are switched to L at time t14. The charge read out to the FD 103 is converted into a voltage by the amplifying unit 104, supplied to the readout circuit 3 via the vertical output line 107, and amplified by the operational amplifier 203. The signal amplified by the operational amplifier 203 is written to the capacitor CTS_A+B. At time t16, the signal PTS_A+B is switched from H to L, and the switch 210 is turned off to end the writing of the signal to the capacitor CTS_A+B.

It should be noted that although the transfer pulse signals PTXA and PTXB are switched to H at the same time at time t12, a configuration is possible in which only the transfer pulse signal PTXB is switched to H and the charge of the second PD 101B is transferred to the FD 103. In this case, because the charge of the first PD 101A has been already transferred to the FD 103, output obtained by adding the charges of the first PD 101A and second PD 101B can be obtained. The above-described operations complete the writing of signals to the capacitors CTSN, CTS_A, and CTS_A+B.

Here, when signals in units of pixels are written to the capacitors CTS_A and CTS_A+B, fixed pattern noise such as a latitudinal band-like smear (hereinafter, referred to as "latitudinal smear"), which occurs during sensing a high intensity subject, and shading sometimes occur if the current for driving the operational amplifier 203 is insufficient. The need to reduce such fixed pattern noise is extremely high with a signal for a usual image ((A+B) image signal) that is used for recording or displaying the image, as compared with signals for focus detection (A image signal and B image signal). In other words, compared with the signal for a usual image, fixed pattern noise is permissible to some extent in the signals for focus detection. That is, a driving current that is required when the signals for focus detection are read out can be made smaller than the driving current for the operational amplifier that is needed when the signal for a usual image is read out.

Figure 7A:
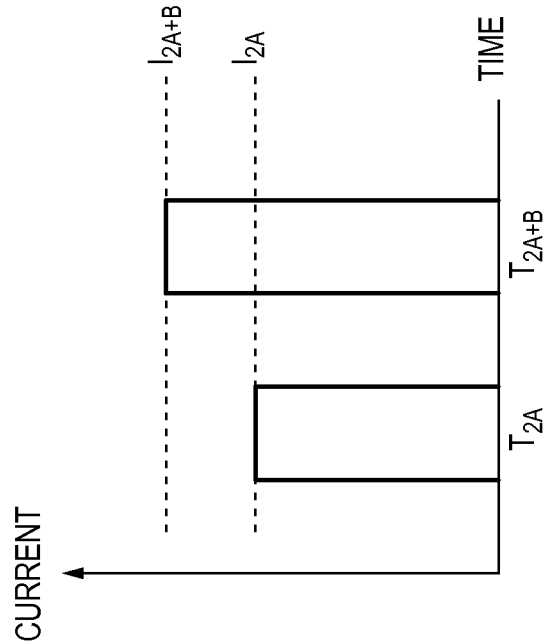
FIGS. 7A and 7B are diagrams illustrating an example of driving current values for a readout circuit according to the first embodiment.

Also, in the first embodiment, the signal to be written to the capacitor CTS_A is used for focus detection, and the signal to be written to the capacitor CTS_A+B is used for a usual image, and the A image signal for focus detection has a lower voltage than that of the (A+B) image signal for a usual image, and a lower amount of charge to be written. In view of this, as shown in FIG. 7A, the value of a current ($I_A$) for driving the operational amplifier 203 during a period ($T_A$) during which the A image signal is written to the capacitor CTS_A is set to a value that is smaller than the value of a current ($I_{A+B}$) for driving the operational amplifier 203 during a period ($T_{A+B}$) during which the (A+B) image signal is written to the capacitor CTS_A+B. Accordingly, it is possible to reduce the energy consumption of the image sensor 1101 while suppressing noise in a usual image.

It should be noted that although the timing (time t7) at which the signal PTS_A is switched to H in order to write the signal to the capacitor CTS_A is set to be before the transfer pulse signal PTXA is switched to H in the first embodiment, the timing may be set to be after the transfer pulse signal PTXA is switched to H. In this case, a period during which the signal is written to the capacitor CTS_A becomes from when the transfer pulse signal PTXA is switched to H (time t8) to when the signal PTS_A is switched to L (time t10). Similarly, the timing (time t11) at which the signal PTS_A+B is switched to H in order to write the signal to the capacitor CTS_A+B may be set to be after the timing (time t12) at which the transfer pulse signals PTXA and PTXB are switched to H. In this case, a period during which the signal is written to the capacitor CTS_A+B becomes from when the transfer pulse signals PTXA and PTXB are switched to H (time t12) to when the signal PTS_A+B is switched to L (time t16).

Returning to the description of FIG. 6, at time t17, the signal PC0R is again switched to H and the switch 206 is turned on, and the readout circuit 3 returns to a state in which the operational amplifier 203 buffers the output of the reference voltage VREF. Then, at time t18, the vertical selection pulse signal PSEL is switched to L, signal readout from the pixels in the selected row ends, and the row that was selected is disconnected from the vertical output line 107. Thereafter, at time t19, the horizontal synchronizing signal SYNC rises again, a vertical selection pulse signal PSEL in the subsequent row is switched to H at the same time, and selection of pixels in the subsequent row is started.

Also, in parallel with the (A+B) image signal being written to the capacitor CTS_A+B, the PTS2_A signal and the PTN2 signal are switched from L to H and the switch 217 and the switch 218 are turned on at time t12. The signal held by the capacitor CTN is written to the capacitor CTN2 via the voltage follower 215, and the signal held by the capacitor CTS_A is written to the capacitor CTS2 via the voltage follower 214. Then, at time t13, the PTN2 signal and the PTS2_A signal are switched from H to L at the same time, and the writing of the signals to the capacitor CTN2 and the capacitor CTS2 ends.

Figure 7B:
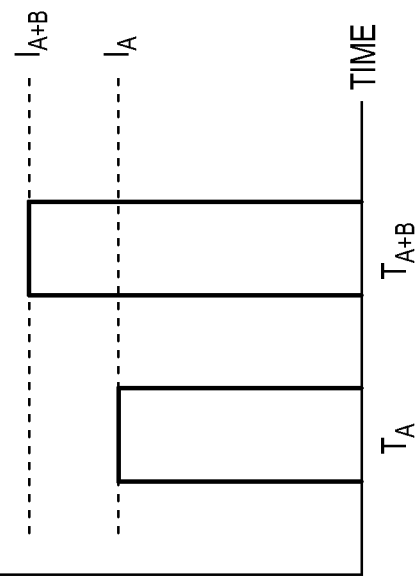

It should be noted that as shown in FIG. 7B, also when the signals are written to the capacitor CTS2 from the voltage followers 213 and 214 as described above, the values of the driving currents supplied from the current sources for the voltage followers 213 and 214 may be changed between when the A image signal is written and when the (A+B) image signal is written. In this case, the value of a current for driving the voltage follower 214 ($I_{2A}$) in a period ($T_{2A}$) during which the A image signal is written is set to a value that is smaller than the value of a current for driving the voltage follower 213 ($I_{2A+B}$) in a period ($T_{2A+B}$) during which the (A+B) image signal is written. Alternatively, a configuration is possible in which separate driving current values can be set in the voltage follower 214 to which the A image signal for focus detection is written and the voltage follower 213 to which the (A+B) image signal for a usual image is written.

Also, the setting of the value of a driving current (amperage) supplied by the current source described above may be changed for both the operational amplifier 203 and the voltage followers 213 and 214, or for either one of the operational amplifier 203 and the voltage followers 213 and 214.

It should be noted that the setting of the value of a driving current (amperage) of the present invention is not limited to being changed for the above-described operational amplifier 203 and the voltage followers 213 and 214. Various types of modifications and changes can be made within the scope relating to the signal readout circuit 3 of the image sensor 1101.

Thereafter, during time t13 to t15, the driving pulse PH of the horizontal scanning circuit 4 is switched from L to H to L sequentially for each readout circuit of each column. Accompanying this, the switches 221 and 222 are turned off→on→off in each column, and horizontal scanning is performed. Signals held by the capacitors CTS2 and CTN2 in each column when the switches 221 and 222 are turned on are respectively read out to the common output lines 223 and 224, and the signal is output by the output amplifier 5 as a difference voltage of signals of the common output lines 223 and 224. This difference voltage is the A image signal. It should be noted that the common output lines 223 and 224 are reset to a reference potential by a reset switch (not shown) each time the signals of a column are read out.

Here, horizontal scanning for the A image signal is performed while the (A+B) image signal is being written to the capacitor CTS_A+B (period of $T_{A+B}$). This horizontal scanning period ends before time t16 at which writing to the capacitor CTS_A+B ends. After the writing of the (A+B) image signal to the capacitor CTS_A+B ends, writing of the (A+B) image signal to the capacitor CTS2 and horizontal scanning therefor are performed. These operations are performed in parallel with resetting of the FD 103 in the subsequent row and writing to the capacitors CTN and CTS_A. At time t17, the PTN2 signal and the PTS2_A+B signal are switched from L to H at the same time, and thereby the switches 216 and 218 are turned on. The signal held by the capacitor CTN is written to the capacitor CTN2 via the voltage follower 215. Furthermore, the signal held by the capacitor CTS_A+B is written to the capacitor CTS2 via the voltage follower 213. Then, at time t18, the PTN2 signal and the PTS2_A+B signal are switched from H to L at the same time, the writing ends.

Thereafter, in the example of FIG. 6, the signals held by the capacitors CTN2 and CTS2 are horizontally scanned during time t18 to time t20 by the driving pulse PH of the horizontal scanning circuit 4 being sequentially switched from L to H to L. The switches 221 and 222 in each column are driven and turned on→off→on by the driving pulse PH. Signals held by the capacitors CTS2 and CTN2 in each column are respectively read out to the common output lines 223 and 224 by the switches 221 and 222, and the signal is output by the output amplifier 5 as a difference voltage of signals of the common output lines 223 and 224. This difference voltage is the (A+B) image signal.

Here, horizontal scanning for the (A+B) image signal is performed in parallel with resetting of the FD 103 in the subsequent row and writing to the capacitors CTN and CTS_A. Parallel scanning can shorten processing time. This horizontal scanning period can be complete by time t20 at which the writing to the capacitor CTS_A in the subsequent row ends.

Information on luminous flux that passes through a part of a pupil of the imaging lens unit can be obtained from the A image signal read out in this manner, and by further subtracting the A image signal from the (A+B) image signal, the B image signal that is a signal output from the second PD 101B can be obtained. Information on luminous flux that has passed through a pupil region different from that of the A image signal can be obtained from this B image signal. Therefore, focus information and range information can be obtained from two pieces of information on luminous flux obtained from these A image signal and B image signal.

As described above, with the first embodiment, the value of a current (amperage) for driving the readout circuit when the signal for focus detection is read out is set to a value that is smaller than the current value for when the signal for a usual image is read out. Accordingly, it is possible to reduce energy consumption of the image sensor required for reading out one frame without influencing the image signal of a usual image.

It should be noted that although a configuration was used in which two photodiodes are provided in a unit pixel 100 in the first embodiment, the number of photodiodes in the unit pixel 100 is not limited to this as long as a plurality of photodiodes are provided therein. For example, a configuration is possible in which four photodiodes are provided in the unit pixel, signals of two photoelectric conversion portions in the unit pixel are read out for focus detection, and signals of all of the photoelectric conversion portions in the unit pixel are read out for image capture.

Second Embodiment

Hereinafter, a second embodiment of the present invention will be described. In the second embodiment, the driving current value for the readout circuit 3 that is supplied by a current source when a signal for focus detection is read out is changed based on a positional relationship with a focus detection region. It should be noted that a configuration of an image capturing apparatus according to the second embodiment is similar to that described with reference to FIGS. 1 to 5, and thus description thereof is omitted here.

Figure 8:
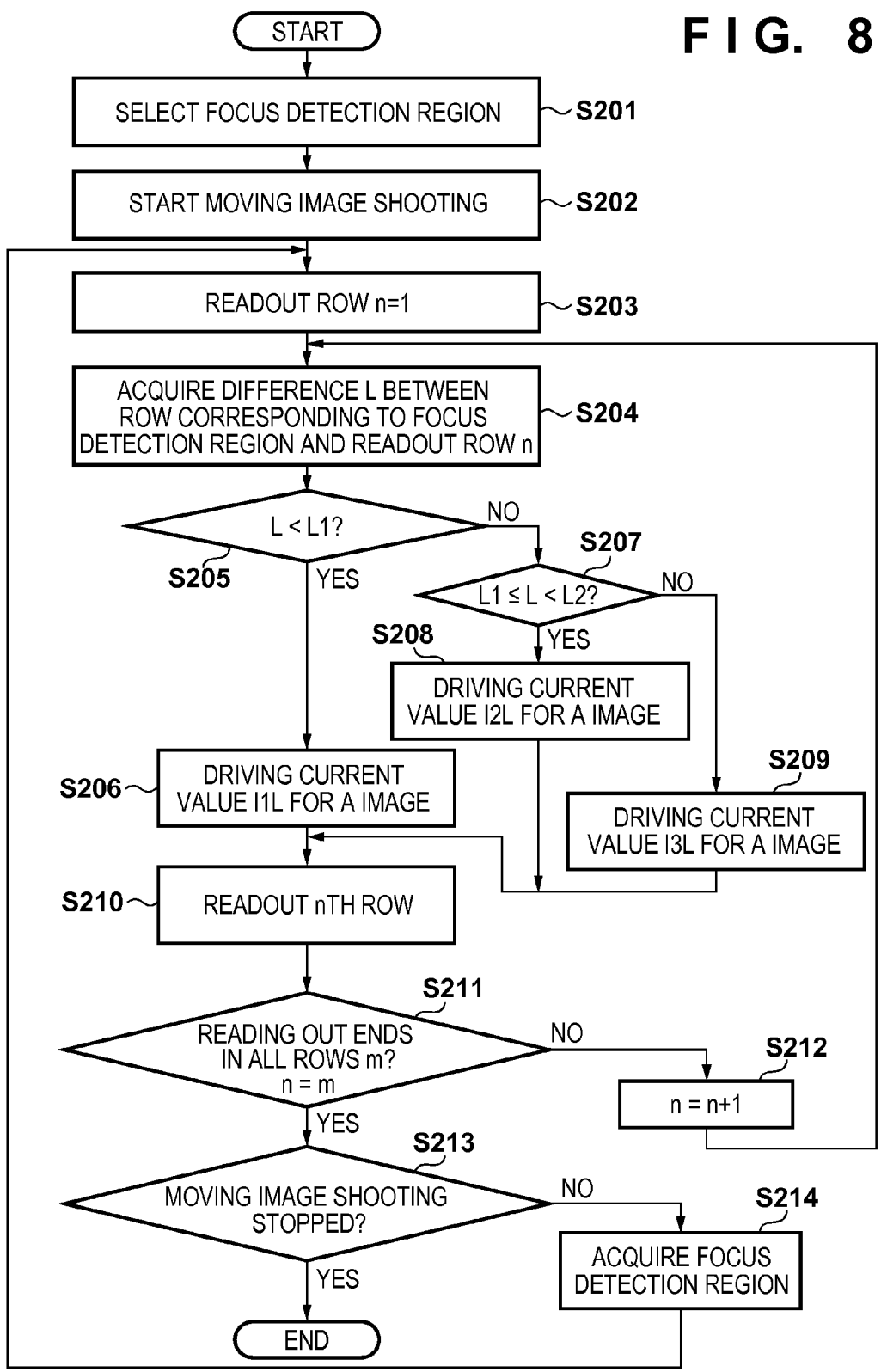
FIG. 8 is a flowchart showing control of a driving current value for a readout circuit in accordance with a positional relationship with a focus detection region according to a second embodiment.

FIG. 8 is a flowchart showing control of the value of a driving current supplied by the current source based on the positional relationship with a focus detection region in the second embodiment. In step S201, when an image capturing apparatus is set to a moving image mode, the image capturing apparatus selects a region where focus detection is to be performed. The focus detection region may be a region that is arbitrarily selected by a user, or a region that is determined by the image capturing apparatus performing subject tracking, face tracking, or the like. Moving image shooting is started in step S202.

Each row of an image sensor 1101 is read out starting from the first row in step S203. In step S203, a counter for a readout row is set to an initial value (n=1) when moving image shooting is started, and when signal readout of a frame of a moving image from the first row to the final row ends and the subsequent frame is to be read out starting from the first row.

In step S204, a difference L between a row corresponding to the focus detection region and a signal readout row n is acquired. If the difference L is large, it means that the signal readout row n is distant from the focus detection region, and if the difference L is small, it means that the signal readout row n is close to the focus detection region.

Figure 9A:
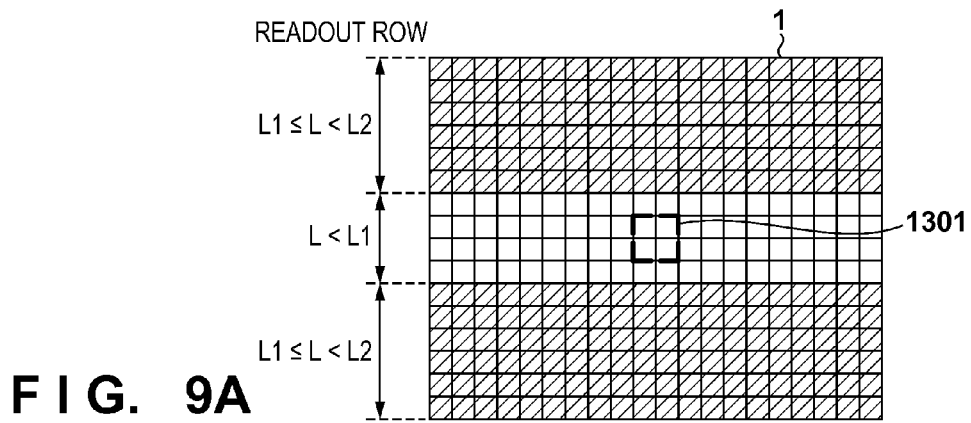
FIGS. 9A and 9B are diagrams showing an example in which readout rows are divided into areas in accordance with the positional relationship with the focus detection region according to the second embodiment.

In step S205, the difference L acquired in step SS204 is compared to a predetermined number of rows L1 determined in advance to determine whether or not L<L1 is satisfied. If L<L1 is satisfied, the processing advances to step S206, and the driving current value for the readout circuit 3 for when a signal for focus detection (A image signal) is read out is set to I1L shown in FIG. 10. For example, as shown in FIG. 9A, in the case where a row including a focus detection region 1301 where L<L1 is satisfied is read out, a driving current value for when the signal for focus detection (A image signal) is read out is set to the same value IL1 as the driving current value for the readout circuit 3 for when a signal for a usual image (A+B image signal) is read out.

On the other hand, if L≥L1 is satisfied, the processing advances to step S207, and a difference L between a row corresponding to the focus detection region and the signal readout row n of the image sensor is compared to a predetermined number of rows L2 determined in advance to determine whether or not L1≤L<L2 is satisfied. If L1≤L<L2 is satisfied, the processing advances to step S208, and the driving current value for the readout circuit 3 for when the signal for focus detection (A image signal) is read out is set to I2L shown in FIG. 10. For example, as shown in FIG. 9A, in the case of reading out a row that does not include the focus detection region 1301 where L1≤L<L2 is satisfied, the driving current value for when the signal for focus detection (A image signal) is read out is set to a value I2L that is smaller than the driving current value I1L for the readout circuit 3 for when the signal for a usual image (A+B image signal) is read out. In this manner, as a result of the driving current value being set to a value I2L that is smaller than I1L, it is possible to suppress energy consumption of the image sensor 1101 without influencing the accuracy of focus detection in the focus detection region 1301. It should be noted that the readout row in the region where L1≤L<L2 is satisfied, which is shown in FIG. 9A, does not include the focus detection region, and thus the driving current value can be made lower than the current value in the first embodiment.

Figure 9B:
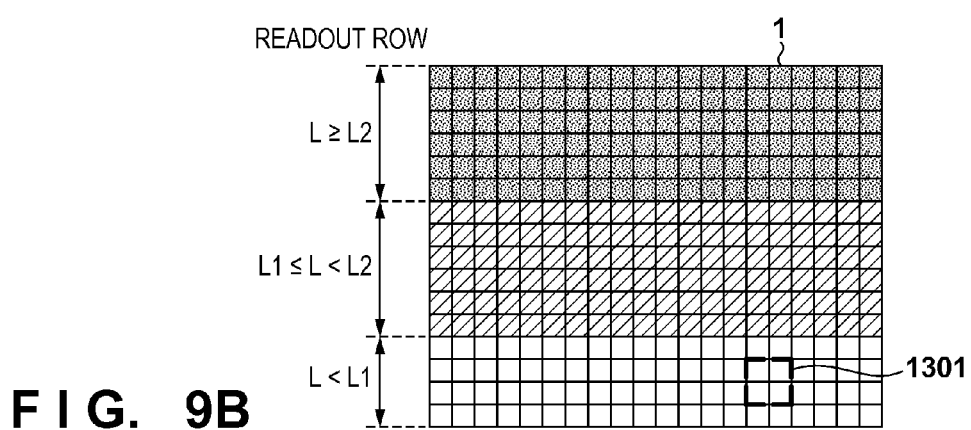
Figure 10:
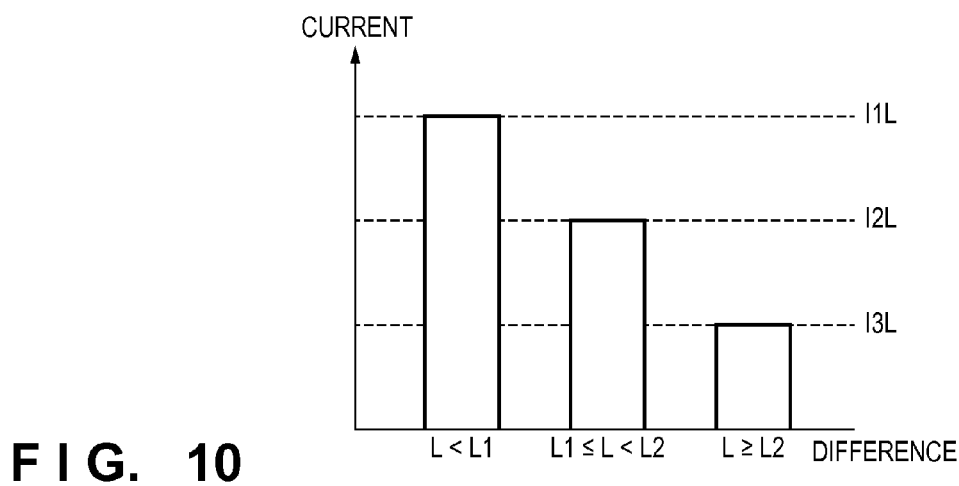
FIG. 10 is a diagram showing an example of a driving current value that is set in a readout circuit in accordance with the positional relationship with the focus detection region according to the second embodiment.

Also, if L≥L2 is satisfied, the processing advances to step S209, and the driving current value for the readout circuit 3 for when the signal for focus detection (A image signal) is read out is set to I3L shown in FIG. 10. For example, as shown in FIG. 9B, in the case of reading out a row that is distant from the focus detection region 1301 where L≥L2 is satisfied by a given distance or greater, the driving current value for when the signal for focus detection (A image signal) is read out is set to a value I3L, which is smaller than I2L. In this manner, as a result of the driving current value being set to a value I3L that is smaller than I2L in the case of reading out the row distant from the focus detection region 1301, even if the focus detection region is changed, it is possible to keep tracking a subject and further suppress the energy consumption of the image sensor 1101.

In step S210, a signal in a target row (nth row) is read out using the driving current value for the readout circuit 3 in the case where the signal for focus detection (A image signal) that has been set in any one of steps S206, S208, and S209 is read out.

In step S211, it is determined whether or not signal readout in a frame of a moving image is complete through the final row m. If n=m is satisfied, it is determined that signal readout in all rows is complete, and the processing advances to step S213. On the other hand, if n<m is satisfied, the processing advances to step S212, the readout row n is set to be n+1, the processing returns to step S204, and the driving current value for the readout circuit 3 in the case of reading out the signal for focus detection (A image signal) in the subsequent row is set.

In step S213, it is determined whether or not moving image shooting has ended. In the case where the moving image shooting has not ended, the processing advances to step S214, and the focus detection region is acquired again. Thereafter, the processing returns to step S203, and the above-described processing is repeated until the moving image is stopped.

As described above, according to the second embodiment, the value of a driving current that is supplied by the current source is controlled based on the focus detection region for the image capturing apparatus, and thereby it is possible to reduce energy consumption of the image sensor while keeping focus detection accuracy.

It should be noted that although the above-described example describes a case where driving current values for when signals for focus detection are read out are divided into three types in accordance with the distance (number of rows) between the readout row n and the focus detection region, the present invention is not limited to this. For example, control may be performed using four or more types of driving current values, or may be performed using two types of driving current values in accordance with whether or not the readout row n is a row including the focus detection region. Furthermore, a driving current value that changes continuously may be used. In other words, when a signal for focus detection in a row that is distant from the focus detection region is read out, it is sufficient that the driving current value is set to a value smaller than that in the case of reading out a signal for focus detection in a row that is close to the focus detection region.

Third Embodiment

Hereinafter, a third embodiment of the present invention will be described. In the third embodiment, the driving current value for a readout circuit 3 that is supplied by a current source when a signal for focus detection is read out is changed in accordance with a temperature condition of an image capturing apparatus. As a result of switching the setting to a predetermined current value at a necessary timing, influences on a signal for a usual image are suppressed and reduction of energy consumption is achieved. It should be noted that a configuration of the image capturing apparatus according to the third embodiment is similar to that described with reference to FIGS. 1 to 5, and thus description thereof is omitted here.

Figure 11:
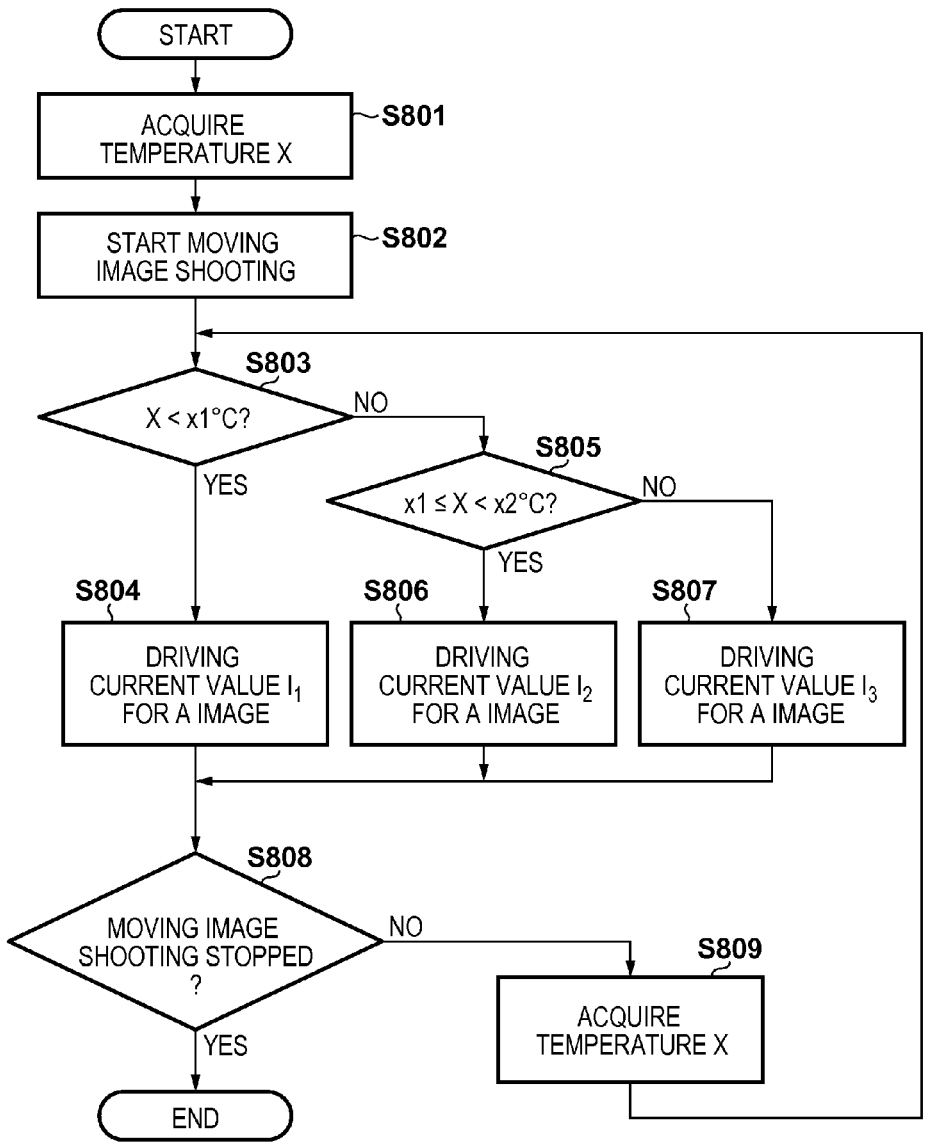
FIG. 11 is a flowchart showing control of a driving current value for a readout circuit in accordance with a temperature condition of an image capturing apparatus according to a third embodiment.

FIG. 11 is a flowchart showing control of the value of a driving current supplied by a current source according to the third embodiment. In step S801, a temperature X inside the image capturing apparatus is acquired. Here, temperature information output by a thermometer IC mounted in the vicinity of an image sensor 1101 is acquired, for example. In step S802, the image capturing apparatus is set to a moving image shooting mode, and moving image shooting is started.

Figure 12A:
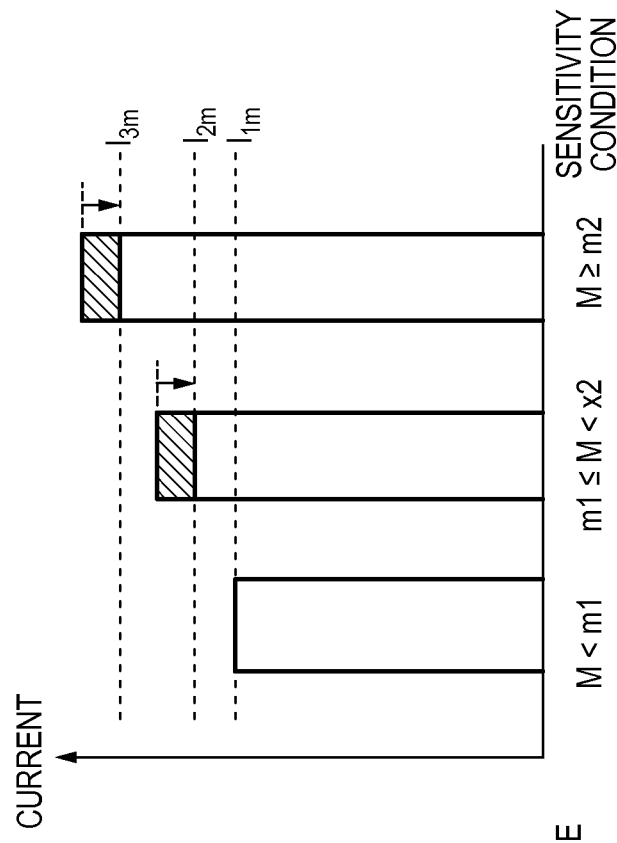
FIGS. 12A and 12B are diagrams showing an example of a driving current value set in the readout circuit in accordance with a temperature condition in the third embodiment.

In step S803, the temperature X immediately before the start of moving image shooting that is acquired in step S801 is compared to a predetermined temperature x1 so as to determine whether or not X<x1 is satisfied. If X<x1 is satisfied, the processing advances to step S804, and the driving current value for the readout circuit 3 for when a signal for focus detection (A image signal) is read out is set to $I_1$. It should be noted that it is assumed that the temperature x1 is set to a lower temperature than a setting temperature (warning display temperature) that warns a user that moving image shooting is about to be stopped due to an increase in the temperature, for example. If X<x1 is satisfied, it is determined that the temperature of the image capturing apparatus main body has leeway to increase. Therefore, as shown in FIG. 12A, the driving current value for when the signal for focus detection (A image signal) is read out is set to the same value as the value of the current $I_1$ for driving the readout circuit 3 for when a signal for a usual image (A+B image signal) is read out.

On the other hand, if X≥x1 is satisfied, the processing advances to step S805, and furthermore the temperature X is compared to a predetermined temperature x2 to determine whether or not x1≤X<x2 is satisfied. The warning display temperature is set to x2, for example. If x1≤X<x2 is satisfied, the processing advances to step S806, and as shown in FIG. 12A, the driving current value for the readout circuit 3 for when the signal for focus detection (A image signal) is read out is set to $I_2$. In this manner, as a result of setting the driving current value to a value $I_2$ that is smaller than $I_1$, it is possible to suppress energy consumption of the image sensor 1101 and the period of time until the warning display is displayed can be made longer than that before the current value setting is changed.

Also, if X≥x2 is satisfied, the processing advances to step S807, and the driving current value for the readout circuit 3 for when the signal for focus detection (A image signal) is read out is set to $I_3$. As a result of setting the driving current value to the value $I_3$ that is smaller than $I_2$, the energy consumption of the image sensor 1101 is suppressed more than in the case where x1≤X<x2 is satisfied. Accordingly, it is possible to extend the period of time from when the warning display is displayed to when the temperature reaches a temperature at which moving image shooting is stopped.

In step S808, it is determined whether or not moving image shooting has ended. In the case where moving image shooting has not ended, the processing advances to step S809, and a temperature X inside the image capturing apparatus is acquired again. Thereafter, the processing returns to step S803, and the above-described processing is repeated until the moving image is stopped.

According to the third embodiment, as described above, it is possible to suppress influences on a signal for a usual image and reduce energy consumption of the image sensor in accordance with a temperature condition of the image capturing apparatus. Accordingly, it is possible to extend the period of time until a warning display temperature or a moving image shooting prohibition temperature at the time of moving image shooting is reached, and to extend the period of time during which imaging is possible.

It should be noted that although the above-described example describes the case where driving current values for when signals for focus detection are read out are divided into three types in accordance with a temperature condition of the image capturing apparatus, the present invention is not limited to this. For example, control may be performed using four or more types of driving current values, or may be performed using two types of driving current values. Furthermore, a driving current value that changes continuously may be used. In other words, in the case where the temperature of the image capturing apparatus is high, it is sufficient that the driving current value for when the signal for focus detection is read out is set to a value that is smaller than that in the case where the temperature is low.

Fourth Embodiment

Hereinafter, a fourth embodiment of the present invention will be described. In the fourth embodiment, the value of a current for driving a readout circuit 3 that is supplied by a current source when a signal for focus detection is read out is changed in accordance with a sensitivity condition of an image capturing apparatus at the time of imaging. It should be noted that a configuration of the image capturing apparatus according to the fourth embodiment is similar to that described with reference to FIGS. 1 to 5, and thus description thereof is omitted here.

The gain of the operational amplifier 203 is increased at the time of high sensitivity imaging, and thus there is substantial need to increase the driving current value for the operational amplifier 203 for when a signal for a usual image is read out, compared to low sensitivity imaging. In this case, energy consumption of the image sensor 1101 is increased more at the time of high sensitivity imaging than at the time of low sensitivity imaging. However, as described above, compared to the signal for a usual image, there is little need to take the signal for focus detection into strict consideration. In other words, when the signal for focus detection is read out, it is possible to make the driving current value smaller than the driving current value for the operational amplifier 203 that is required for the signal for a usual image at the time of high sensitivity imaging.

Figure 12B:
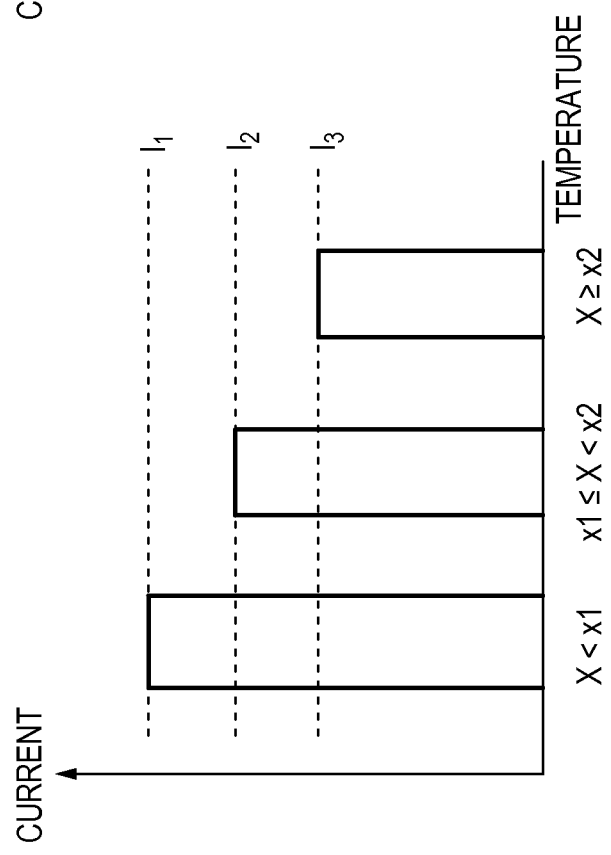
Figure 13:
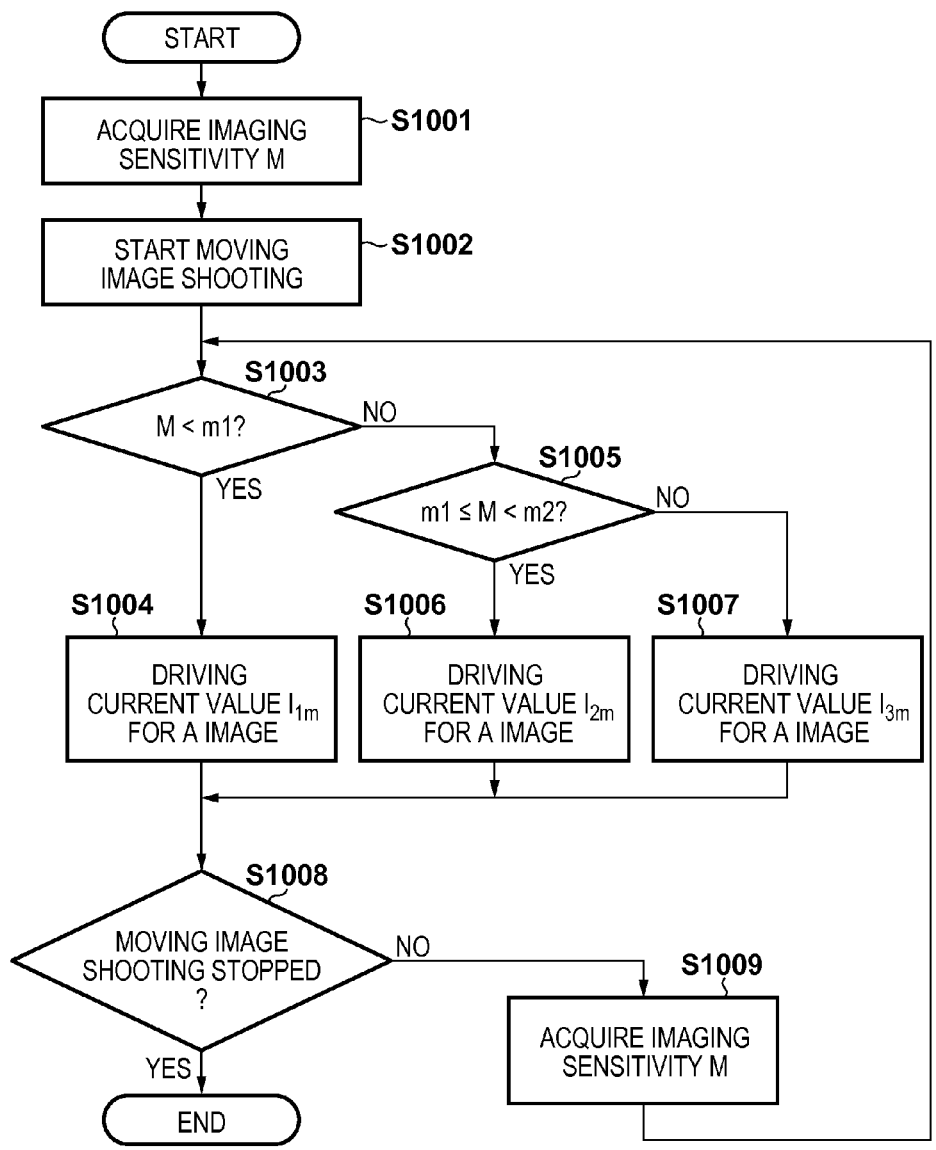
FIG. 13 is a flowchart showing control of a driving current value for a readout circuit in accordance with an imaging sensitivity condition of an image capturing apparatus according to a fourth embodiment.

FIG. 13 is a flowchart showing control of the value of a driving current that is supplied by the current source according to the fourth embodiment. In step S1001, information on a set sensitivity M of an image capturing apparatus is acquired. In step S1002, the image capturing apparatus is set to a moving image shooting mode, and moving image shooting is started. In step S1003, the imaging sensitivity M acquired in step S1001 is compared to a predetermined sensitivity m1 to determine whether or not M<m1 is satisfied. If M<m1 is satisfied, the processing advances to step S1004, and the driving current value for the readout circuit 3 for when the signal for focus detection (A image signal) is read out is set to $I_{1m}$ shown in FIG. 12B, for example. For example, in the case of letting m1 be ISO3200, if the sensitivity M is less than ISO3200, the current for driving the operational amplifier 203 does not need to be increased with respect to the signal for a usual image, and the driving current value for driving the readout circuit 3 for when the signal for focus detection (A image signal) is read out is set to $I_{1m}$. It is assumed that the current value $I_{1m}$ here is the same value as the driving current value for the readout circuit 3 for when the signal for a usual image is read out in the case where the imaging sensitivity M is less than ISO3200.

On the other hand, if M≥m1 is satisfied, the processing advances to step S1005, and furthermore the imaging sensitivity M is compared to a predetermined sensitivity m2 to determine whether or not m1≤M<m2 is satisfied. If m1≤M<m2 is satisfied, the processing advances to step S1006, and the driving current value for the readout circuit 3 for when the signal for focus detection (A image signal) is read out is set to $I_{2m}$ shown in FIG. 12B, for example. As one example, it is assumed that it is necessary to increase the current for driving a predetermined operational amplifier 203 with respect to the signal for a usual image in the case where the imaging sensitivity is greater than or equal to ISO3200 and less than ISO12800. In this case, if the imaging sensitivity M is greater than or equal to ISO3200 and less than ISO12800, the driving current value for the readout circuit 3 for when the signal for focus detection (A image signal) is read out is set to $I_{2m}$. It is assumed that $I_{2m}$ here is a value that is smaller than the driving current value for the readout circuit 3 for when the signal for a usual image is read out in the case where the imaging sensitivity M is greater than or equal to ISO3200 and less than ISO12800.

Also, if M≥m2 is satisfied, the processing advances to step S1007, and the driving current value for the readout circuit 3 for when the signal for focus detection (A image signal) is read out is set to $I_{3m}$ shown in FIG. 12B, for example. As one example, it is assumed that in the case where the imaging sensitivity M is greater than or equal to ISO12800, it is necessary to further increase the current for driving a predetermined operational amplifier with respect to the signal for a usual image, compared to the case where the imaging sensitivity M is greater than or equal to ISO3200 and less than ISO12800. In this case, the driving current value for the readout circuit 3 for when the signal for focus detection (A image signal) is read out is set to $I_{3m}$ in the case where the imaging sensitivity M is greater than or equal to ISO12800. It is assumed that $I_{3m}$ here is a value that is smaller than the driving current value for the readout circuit 3 for when the signal for a usual image is read out in the case where the imaging sensitivity M is greater than or equal to ISO12800.

Thus, when the imaging sensitivity is increased, the value of a current (amperage) for driving the readout circuit 3 for when the signal for focus detection (A image signal) is read out is set to a value that is smaller than that for when the signal for a usual image is read out, and thereby the energy consumption of the image sensor 1101 can be reduced.

In step S1008, it is determined whether or not moving image shooting has ended. In the case where moving image shooting has not ended, the processing advances to step S1009, and a set sensitivity information M of an image capturing apparatus is acquired again. Thereafter, the processing returns to step S1003, and the above-described processing is repeated until the moving image shooting is stopped.

According to the fourth embodiment, as described above, it is possible to suppress influences on the signal for a usual image and reduce energy consumption of the image sensor according to the imaging sensitivity of the image capturing apparatus. Accordingly, it is possible to extend the period of time during which imaging is possible.

It should be noted that although the above-described example describes the case where driving current values for when signals for focus detection are read out are divided into three types in accordance with the imaging sensitivity of the image capturing apparatus, the present invention is not limited to this. For example, control may be performed using four or more types of driving current values, or may be performed using two types of driving current values. Furthermore, a driving current value that changes continuously may be used. In other words, in the case where the imaging sensitivity of the image capturing apparatus is low, it is sufficient that the driving current value for when the signal for focus detection is read out is made smaller than that in the case where the imaging sensitivity is high.

Fifth Embodiment

Next, a fifth embodiment of the present invention will be described. In the fifth embodiment, the value of a current for driving a readout circuit 3 that is supplied by a current source when a signal for focus detection is read out is changed in accordance with a frame rate setting condition at the time of imaging. It should be noted that the configuration of an image capturing apparatus is similar to that described with reference to FIGS. 1 to 5, and thus description thereof is omitted here.

For example, in the case where a frame rate is set to 60 fps, the number of frames per second is double compared to the case where the frame rate is 30 fps, and thus energy consumption of an image sensor 1101 and a signal processing circuit 1103 increases. In other words, the amount of heat generated in the image capturing apparatus main body increases, and thus a period of time during which moving image shooting is possible is shorter in the case where the frame rate is high, that is, 60 fps. Therefore, when a high frame rate is set, the value of a current for driving the readout circuit 3 when the signal for focus detection is read out is switched to a value smaller than that when a low frame rate is set to achieve reduction of energy consumption.

Figure 14:
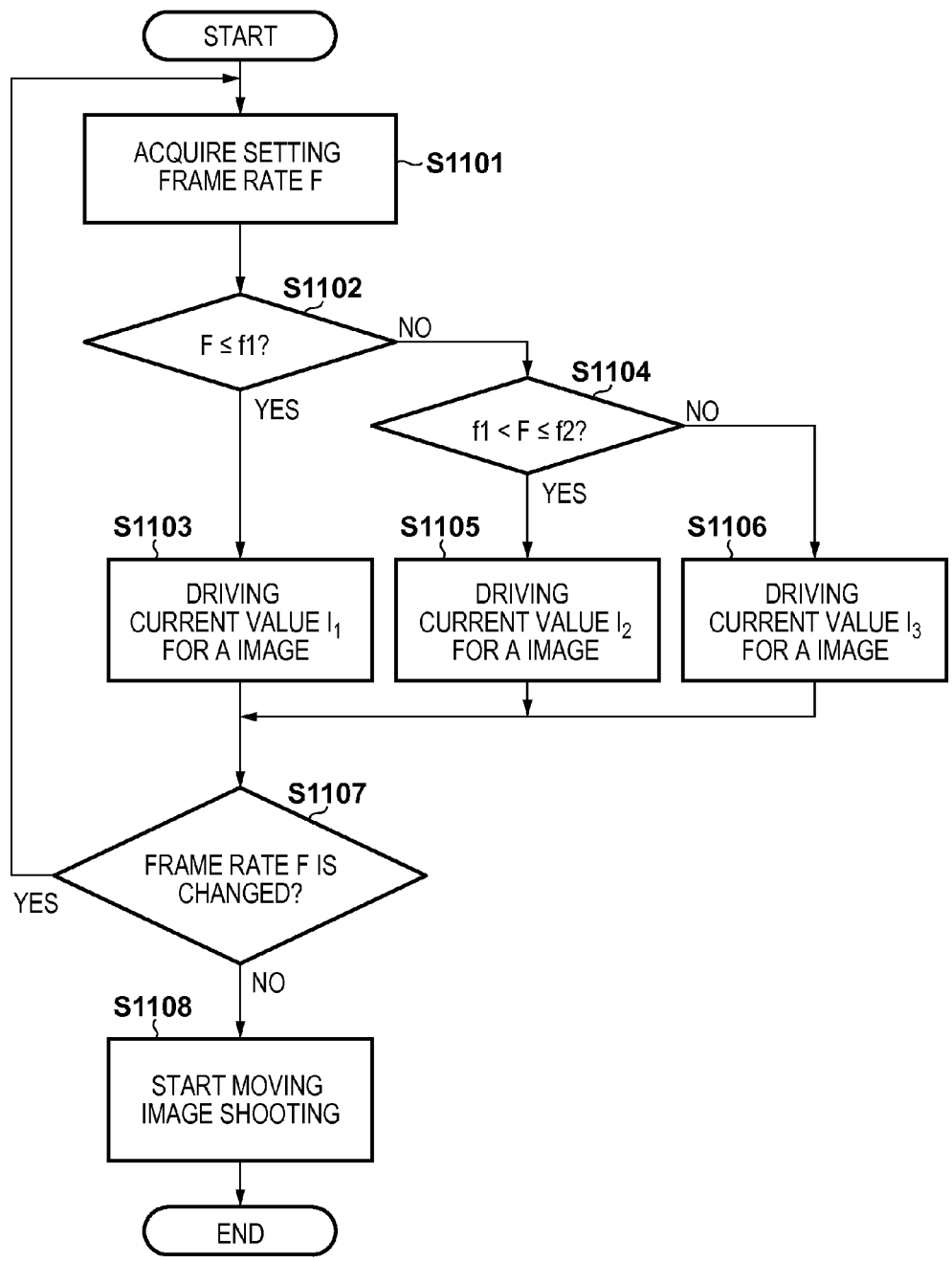
FIG. 14 is a flowchart showing control of a driving current value for a readout circuit in accordance with a setting frame rate of an image capturing apparatus according to a fifth embodiment.

FIG. 14 is a flowchart showing control of the value of a driving current that is supplied by a current source according to the fifth embodiment. In step S1101, information on the setting frame rate F before the start of moving image shooting is acquired. In step S1102, the frame rate F acquired in step S1001 is compared to a predetermined frame rate f1 to determine whether or not F≤f1 is satisfied. If F≤f1 is satisfied, the processing advances to step S1103, and the driving current value for the readout circuit 3 for when the signal for focus detection (A image signal) is read out is set to $I_1$ shown in FIG. 12A, for example. As one example, in the case where the frame rate f1 is set to 30 fps, if a setting frame rate is less than or equal to 30 fps, the driving current value for the readout circuit 3 for when the signal for focus detection (A image signal) is read out is set to $I_1$. It should be noted that it is assumed that the driving current value $I_1$ here is the same value as the driving current value for the readout circuit 3 for when the signal for a usual image is read out.

On the other hand, if F>f1 is satisfied, the processing advances to step S1104, and furthermore the frame rate F is compared to a predetermined frame rate f2 (f1<f2) to determine whether or not f1<F≤f2 is satisfied. If f1≤F<f2 is satisfied, the processing advances to step S1105, and the driving current value for the readout circuit 3 for when the signal for focus detection (A image signal) is read out is set to $I_2$ shown in FIG. 12A, for example. As one example, in the case where the frame rate f2 is set to 60 fps, if a setting frame rate F is 30 fps<F≤60 fps, the driving current value for the readout circuit 3 for when the signal for focus detection (A image signal) is read out is set to $I_2$. It should be noted that the driving current value $I_2$ here is a value that is smaller than the driving current value for the readout circuit 3 for when the signal for a usual image is read out.

Also, if F>f2 is satisfied, the processing advances to step S1106, and the driving current value for the readout circuit 3 for when the signal for focus detection (A image signal) is read out is set to $I_3$. For example, in the case where the frame rate F is higher than 60 fps, the driving current value for the readout circuit 3 for when the signal for focus detection (A image signal) is read out is set to $I_3$. As a result of setting $I_3$ to a value that is smaller than $I_2$, energy consumption of the image sensor 1101 is suppressed more than in the case where f1<F≤f2 is satisfied.

In step S1107, it is determined whether or not the setting frame rate has been changed. If it has not been changed, the processing advances to step S1108, and moving image shooting is started. In the case where the frame rate is changed, the processing returns to step S1101, and the changed frame rate setting information is acquired again.

In this manner, when a frame rate at the time of imaging is increased, the value of a current (amperage) for driving the readout circuit 3 for when the signal for focus detection (A image signal) is read out is made smaller than that for when the signal for a usual image is read out, and thereby the energy consumption of the image sensor 1101 can be reduced. In other words, it is possible to extend the period of time during which moving image shooting at a high frame rate is possible.

It should be noted that although the above-described example describes the case where driving current values for when the signals for focus detection are read out are divided into three types in accordance with a frame rate, the present invention is not limited to this. For example, control may be performed using four or more types of driving current values, or may be performed using two types of driving current values. Furthermore, a driving current value that changes continuously may be used. In other words, in the case where a frame rate is high, it is sufficient to make the driving current value for when the signal for focus detection is read out smaller than that in the case where the frame rate is low.

Although the embodiments of the present invention has been described above, the present invention is not limited to these embodiments. The present invention may be implemented using various combinations of temperature conditions, sensitivity settings, and frame rate settings for the image capturing apparatus. Various modifications and changes can be made within the scope of imaging conditions for the image capturing apparatus that are envisioned.

For example, the above-described first to fifth embodiments describe the case where there is one readout system, but by each system being configured as described above, the present invention can be applied to a case where there are more than two readout systems.

Also, although the above-described first to fifth embodiments describe the case where each pixel has two photodiodes, each pixel may have three or more photodiodes. In this case, control may be performed using a driving method in which signals are read out from part of a plurality of photodiodes in each pixel in order to obtain the signal for focus detection, and a driving method in which charges of a plurality of photodiodes are added and read out for each pixel in order to obtain the signal for imaging. For example, in the case where each pixel has four photodiodes by respectively dividing each pixel into two sections in the horizontal and vertical directions, the charges of two photodiodes that are aligned in the horizontal or vertical direction are added and read out for each pixel in order to obtain the signal for focus detection. Then, when the charges are read out from part of a plurality of photodiodes for each pixel, control is performed such that the amperage that is to be supplied to the readout circuit 3 is made small, and thereby the present invention can be applied thereto.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-117090, filed on Jun. 5, 2014, and 2014-248416, filed on Dec. 8, 2014 which are hereby incorporated by reference herein in their entirety.

What is claimed is:

1. An image capturing apparatus including a plurality of photoelectric conversion portions for each of a plurality of microlenses that are arranged in matrix, the image capturing apparatus comprising:
   a readout transistor configured to be driven using a first driving method in which a first signal is read out from part of the plurality of photoelectric conversion portions via an output line, and a second driving method in which an added signal is read out via the output line that is obtained by adding the first signal and a second signal read out from other part of the plurality of photoelectric conversion portions;
   a supplier configured to, in a case where the first signal is read out using the first driving method, supply an amperage that is smaller than that in a case where the added signal is read out using the second driving method, to the readout transistor; and
   a controller configured to control the amperage that is to be supplied via the supplier,
   wherein the controller controls supplying of an amperage based on positions of the plurality of microlenses arranged in the matrix.

2. The image capturing apparatus according to claim 1, wherein in a ease where a distance between a readout row and a selected region is greater than or equal to a second distance that is larger than a first distance that is set to include the selected region, the controller performs control such that an amperage that is to be supplied while the first signal is being read out using the first driving method is made smaller than that in a case where the distance between the readout row nd the selected region is less than the second distance.

3. The image capturing apparatus according to claim 1, further comprising:
   a detector configured to detect a temperature of the image capturing apparatus,
   wherein in a case where a temperature detected by the detection unit is greater than or equal to a first temperature that is determined in advance, the controller performs control such that an amperage that is to be supplied to the readout transistor while the first signal is being read out using the first driving method is reduced.

4. The image capturing apparatus according to claim 3, wherein, in a case where the detected temperature is greater than or equal to a second temperature that is determined in advance and that is higher than the first temperature, the controller performs control such that an amperage that is to be supplied while the first signal is being read out using the first driving method is made smaller than that in a case where the detected temperature is lower than the second temperature.

5. The image capturing apparatus according to claim 1, wherein, in a case where sensitivity of the image capturing apparatus is greater than or equal to a first setting sensitivity that is determined in advance, the controller performs control such that an amperage that is to be supplied while the first signal is being read out using the first driving method is reduced.

6. The image capturing apparatus according to claim 5, wherein, in a case where the sensitivity is lower than a second setting sensitivity that is higher than the first setting sensitivity and that is determined in advance, the controller performs control such that an amperage that is to be supplied while the first signal is being read out using the first driving method is made smaller than that in a case where the sensitivity is greater than or equal to the second setting sensitivity.

7. The image capturing apparatus according to claim 1, wherein, in a case where a frame rate is higher than a first frame rate that is determined in advance, the controller performs control such that an amperage that is to be supplied while the signal is being read out using the first driving method is reduced.

8. The image capturing apparatus according to claim 7, wherein in a case where the detected frame rate is higher than a second frame rate that is higher than the first frame rate and that is determined in advance, the controller performs control such that an amperage that is to be supplied while the first signal is being read out using the first driving method is made smaller than that in a case where the detected frame rate is lower than or equal to the second frame rate.

9. The image capturing apparatus according to claim 1, further comprising:
   a focus detection unit configured to perform focus detection based on the first signal read out using the first driving method and a signal obtained by subtracting the first signal read out using the first driving method from the added signal read out using the second driving method,
   wherein the plurality of photoelectric conversion portions are two photoelectric conversion portions.

10. A method for controlling an image capturing apparatus including a plurality of photoelectric conversion portions for each of a plurality of microlenses that are arranged in matrix, and a readout transistor configured to be driven using a first driving method in which a first signal is read out from part of the plurality of photoelectric conversion portions via an output line and a second driving method in which an added signal is read out via the output line that is obtained by adding the first signal and a second signal read out from other part of the plurality of photoelectric conversion portions, the control method comprising:
   supplying a current of st amperage when the added signal output from the photoelectric conversion portions is read out using the second driving method; and
   supplying a current of a second amperage that is smaller than the first amperage while the first signal is being read out using the first driving method,
   wherein supplying of an amperage is controlled based on positions of the plurality of microlenses arranged in the matrix.

* * * * *